US005647000A

United States Patent [19]
Leighton

[11] Patent Number: 5,647,000
[45] Date of Patent: Jul. 8, 1997

[54] FAILSAFE KEY ESCROW SYSTEM

[76] Inventor: Frank Thomsen Leighton, 15 Charlesden Park, Newtonville, Mass. 02160

[21] Appl. No.: 706,975

[22] Filed: Sep. 3, 1996

Related U.S. Application Data

[63] Continuation of Ser. No. 289,510, Aug. 12, 1994, abandoned.

[51] Int. Cl.$^6$ .................................................. H04L 9/30
[52] U.S. Cl. .................. 380/30; 380/28; 380/44
[58] Field of Search ..................... 380/44, 28, 30

[56] References Cited

U.S. PATENT DOCUMENTS

| | | | |
|---|---|---|---|
| 4,879,747 | 11/1989 | Leighton et al. | 380/23 |
| 4,944,007 | 7/1990 | Austin | 380/21 |
| 4,944,009 | 7/1990 | Micali et al. | 380/46 |
| 4,995,081 | 2/1991 | Leighton et al. | 380/23 |
| 5,276,737 | 1/1994 | Micali | 380/30 |
| 5,315,658 | 5/1994 | Micali | 380/30 |

OTHER PUBLICATIONS

Micali, Silvio, "Fair Public–Key Cryptosystems", May 20, 1992.

Pedersen, Torben Pryds, "Distributed Provers with Applications to Undeniable Signatures", *EUROCRYPT '91 Abstracts*, University of Sussex, Brighton, UK, 8th–11th Apr. 1991, pp. 117–122.

Beth, Th., "Zur Diskussion gestellt", *Informatik–Spektrum*, vol. 13, 1990, pp. 204–215.

Feldman, Paul, "A Practical Scheme for Non–interactive Verifiable Secret Sharing", 1987, pp. 427–437.

Blakley, G.R., "Safeguarding Cryptographic Keys", *AFIPS–Conference Proceedings*, vol. 48, National Computer Conference, 1979, pp. 313–317.

Shamir, Adi, "How to Share a Secret", *Communication of the ACM*, vol. 22, No. 11, Nov., 1979, pp. 612–613.

DeMillo, Richard A.; Davida, George I.; Dobkin, David P.; Harrison, Michael A.; and Lipton, Richard J., *Cryptology in Revolution: Mathematics and Models*, San Francisco, CA, Jan. 5–6, 1981, pp. 152–155.

Simmons, Gustavus J., "How to (Really) Share a Secret", *Advances in Cryptology–CRYPTO '88*, pp. 390–448.

Desmedt, Yvo; and Frankel, Yair, "Threshold Cryptosystems", *Advances in Cryptology–CRYPTO '89*, pp. 307–315.

Chor, Benny; Goldwasser, Shafi; Micali, Silvio; and Awerbuch, Baruch, "Verifiable Secret Sharing and Achieving Simultaneity in the Presence of Faults," IEEE Conf. on Foundations of CS, 1985, pp 383–395.

Benaloh, Josh Cohen, "Secret Sharing Homomorphisms: Keeping Shares of a Secret Secret", *Advances in Cryptology–CRYPTO '86*, pp. 251–260.

Galil, Zvi; and Yung, Moti, "Partitioned Encryption and Achieving Simultaneity by Partitioning", Oct. 19, 1987, pp. 81–88.

Feldman, Paul Neil, "Optimal Algorithms for Byzantine Agreement" May 13, 1988.

Diffie, Whitfield; and Hellman, Martin E.; "New Directions in Cryptography", *IEEE Transactions on Information Theory*, vol. IT–22, No. 6 Nov. 1976, pp. 644–654.

(List continued on next page.)

*Primary Examiner*—Gilberto Barrón, Jr.

[57] ABSTRACT

A method of generating cryptographic keys to implement a Failsafe Key Escrow system. A prime modulus Q and a generator G for $Z_Q$ are publicly known. The public key $P_X$ that is escrowed for user X is $G^{SX}$ mod Q, where Sx is the secret key for user X. The user picks a random secret value A from [0, Q–2] and announces the value of $G^A$ mod Q to a set of trustees or a central authority. Next the user "shares" A with the trustees using a verifiable secret sharing scheme. The trustees and/or the central authority selects a random value B from the interval [0, Q–2] and they set the user's public key to be $P_X=(G^A)G^B$ mod Q. The value of B is returned to the user and is escrowed with the public key for X. The value of B is not released to the public. The user's then sets his secret key to be $S_X=A+B$ mod (Q–1).

10 Claims, 1 Drawing Sheet

OTHER PUBLICATIONS

Pedersen, Torben Pryds, "Distributed Provers with Applications to Undeniable Signatures", *Advances in Cryptology–EUROCRYPT '91*, Brighton, UK, Apr. 1991, pp. 221–242.

G. Simmons, "How to Insure that Data Acquired to Verify Treaty Compliance are Trustworthy," *Proceedings IEEE*, vol. 76, No. 5, May 1988.

Merkle, Ralph C., "A Digital Signature Based on a Conventional Encryption Function," 1987.

Meyer, Carl H; and Matgas, Stephen M., *Cryptography: A New Dimension in Computer Data Security*, 1982, pp. 350–428 (Chapters 8 and 9).

Beker, Henry and Piper, Fred, *Cipher Systems*, 1982, pp. 292–305 (Sections 8.2 and 8.3).

Longley, Dennis, *Data & Computer Security*, 1987, pp. 120 and 323.

Konheim, Alan G. *Cryptography—A Primer*, 1981, pp. 285–293 (Chapter 7).

Denning D.E.R., *Cryptograph and Data Security*, 1982, pp. 161–179 (Sections 3.6 and 3.7).

Simmons, Gustavus J (editor), *Contemporary Cryptology—The Science of Information Integrity*, 1992, pp. 325 –419 and 615 –630 (Chapters 6, 7, and 13).

Micali, S., "Fair Public Key Cryptosystems," *Advances in Cryptology–CRYPTO '92*, Aug. 1992.

Mical, S., "Fair Cryptosystems," MIT/LCS/TR–579.b, Nov. 1993.

Leighton, Tom; and Micali, S, "New Approaches to Secret-Key Exchange," Apr. 1993.

Leighton, Tom; and Kilian, Joseph, "Failsafe Key Escrow," Aug. 1994.

FAILSAFE KEY ESCROW SYSTEM

This application is a continuation of Ser. No. 08/289,510 filed Aug. 12, 1994 now abandoned.

The present invention provides a method for escrowing cryptographic keys (hereinafter, Failsafe Key Escrow (FKE)) in which the authorities interact with the users to select the cryptographic keys that are to be escrowed. The system has the following five properties;

Property 1: Each user in the system should have sufficient control over his or her secret key to be sure that the key is chosen securely.

Property 2: The central authority will also be guaranteed that the secret key for each user is chosen securely even if the user doesn't have access to a good random number generator or if the user fails to use the random number generator properly.

Property 3: Each user will be guaranteed that his or her secret key will remain secret unless a sufficient number of trustees release their shares of the key to the central authority.

Property 4: The central authority needs to be assured that it can obtain the secret key for a user who is suspected of using his or her key for encryption in the context of illegal activities by retrieving shares of the key from a certain number of trustees.

Property 5: The central authority needs to be assured that the escrow system will not be abused by criminals in a way that allows them to communicate without fear of court-authorized wiretapping. More precisely, if two criminals abuse the FKE by using their public keys to communicate using any published public-key encryption algorithm, and the central authority is provided knowledge of the criminals' secret keys by the trustees, then it should as easy (at least on a probabilistic basis) for the central authority to decrypt the message traffic between the criminals as it is for the criminals themselves to decrypt that traffic.

The new method is substantially more secure than the Fair Public—Key Cryptosystem (FPKC) approach advocated by Micali [5]. This is because the FPKC approach does not satisfy Properties 2 and 5.

In particular, Killian [3] has recently shown how the public keys stored in Micali's FPKC escrow scheme can be used by criminals to communicate (using a published public key cryptosystem (PKC)) in a way that the Government will not be able to decipher, even if the secret keys for the users are provided to the Government by the trustees. This means that it is fairly easy for criminals to subvert the Micali FPKC so as to prevent the Government from deciphering their communications. Such abusive use of the key escrow system is not possible in the Failsafe Key Escrow approach described here.

The Failsafe Key Escrow method described here also has the advantage of insuring that legitimate but technically unsophisticated users will be prevented (with overwhelmingly high probability) from choosing keys which are not cryptographically secure. Hence, the Government or a company can be sure that its employees are getting secure keys even if they fail to properly access a secure random number generator. Such assurances are not possible in the Micali FPKC.

The FKE method described here is no more expensive to use than (and, in some cases, it is much less costly than) Micali's FPKC technology. In addition, by Properties 1 and 3, it provides the same basic assurances of fairness to legitimate users as does the Micali FPKC. Hence, the Failsafe Key Escrow approach offers all of the benefits of FPKC while providing the substantial advantage of security for the Government as well as the unsophisticated user.

BACKGROUND

In a Public Key Cryptosystem, each user is assigned or chooses a matching pair of keys $(P_X, S_X)$, where $P_X$ is the public key corresponding to the pair and $S_X$ is the secret key. For authentication purposes, the public key for each user is catalogued and/or certified by a central authority (or authorities) so that other users in the system can retrieve the authentic public key for any individual. Public Key Cryptosystems can be used for many purposes, including encryption and/or digital signatures.

One problem with a PKC (and Cryptosystems in general) is that they may be abused by non-law-abiding users. For example, two criminals could communicate using a PKC established by the Government and an authority would have no way to decrypt their message traffic, even if the authority had received a court authorization to wiretap the communication. Such activity might take place even if the PKC were established solely for the purposes of digital signatures since the criminals might use the PKC for other purposes such as encryption.

This problem has been addressed in a series of papers. Blakley [1] and Shamir [6] describe methods wherein the secret cryptographic key of each user is shared among one or more trustees. (Trustees are presumably few in number and are highly trusted entities.) In particular, each trustee is given a secret piece of the secret key for each user. The sharing of a key needs to satisfy 2 properties. First, no subset of k trustees should be able to pool their knowledge in order to figure out the secret key of a user. Second, any set of h>k trustees should be able to recover the secret key of a user by pooling their shares of that key. Many such "secret sharing" schemes are known in the literature (e.g., see the survey paper by Simmons [7]). In such a scheme, the user is assured that the authorities cannot learn his or her secret key without the approval of at least k+1 trustees, and the authorities are assured that they can obtain the secret key of any individual with the approval of any h trustees. Variations of these schemes are known which can also handle trustees who work in cooperation with the criminals, provided that the number of such malicious trustees is not too large.

One difficulty with the secret sharing schemes is that there is no provision for insuring that the trustees have received valid shares for each user's secret key. Indeed, when the trustees reveal their shares under a court order (say), the shares may be found to be useless because the criminal user did not provide proper shares of his or her secret key. This problem is resolved in [2], where it is shown how shares can be provided in a way so that each trustee can be assured that he or she has received a valid share of the secret key. A user who does not provide valid shares for their secret key can then be identified and excluded from the system.

A secret sharing scheme in which each trustee can be assured that he or she has a valid share of a secret is known as a Verifiable Secret Sharing (VSS) scheme. Many such schemes are known in the literature. In [5], Micali claims that a VSS scheme used in this fashion forms what he calls a Fair Public—Key Cryptosystem. Although the precise definition of a Fair PKC is not provided, Micali states that a key property of a Fair PKC is that it "cannot be misused by criminal organizations" [5]. As demonstrated by the Killian attack, however, it is clear that the Micali method for Fair PKCs can be seriously misused by criminals.

The flaw in the Micali method is derived from the fact that it is possible for a user X to choose a pair of keys $(S_X, P_X)$ with the special properties that:

1) the trustees can be provided with valid shares of the secret key $S_X$, and 2) the public key $P_X$ can be easily converted into a second public key $P'_X$ (using a published algorithm) for a second cryptosystem for which the user has also precomputed a second secret key $S'_X$.

The criminal user can then communicate using the second cryptosystem and the second pair of keys. The central authority (with the aide of the trustees) can retrieve $S_X$ but this will not be useful in deciphering traffic encrypted with $S'_X$. Moreover, the central authority may have no hope of discovering $S'_X$.

This problem can be resolved by having the trustees themselves select the pair of keys for each user, as suggested in [4]. But schemes in which the trustees select the secret key for each user may leave the user with no assurance that his key has been properly generated (so as to be secure). Such a scheme would not satisfy Property 1.

It would be desirable to have a method for the selection of key pairs for individuals that protects the privacy and security concerns of law-abiding users as well as the security concerns of the central authority. That is the subject of this paper.

DETAILED DESCRIPTION OF A SPECIFIC EMBODIMENT

Figure 1:
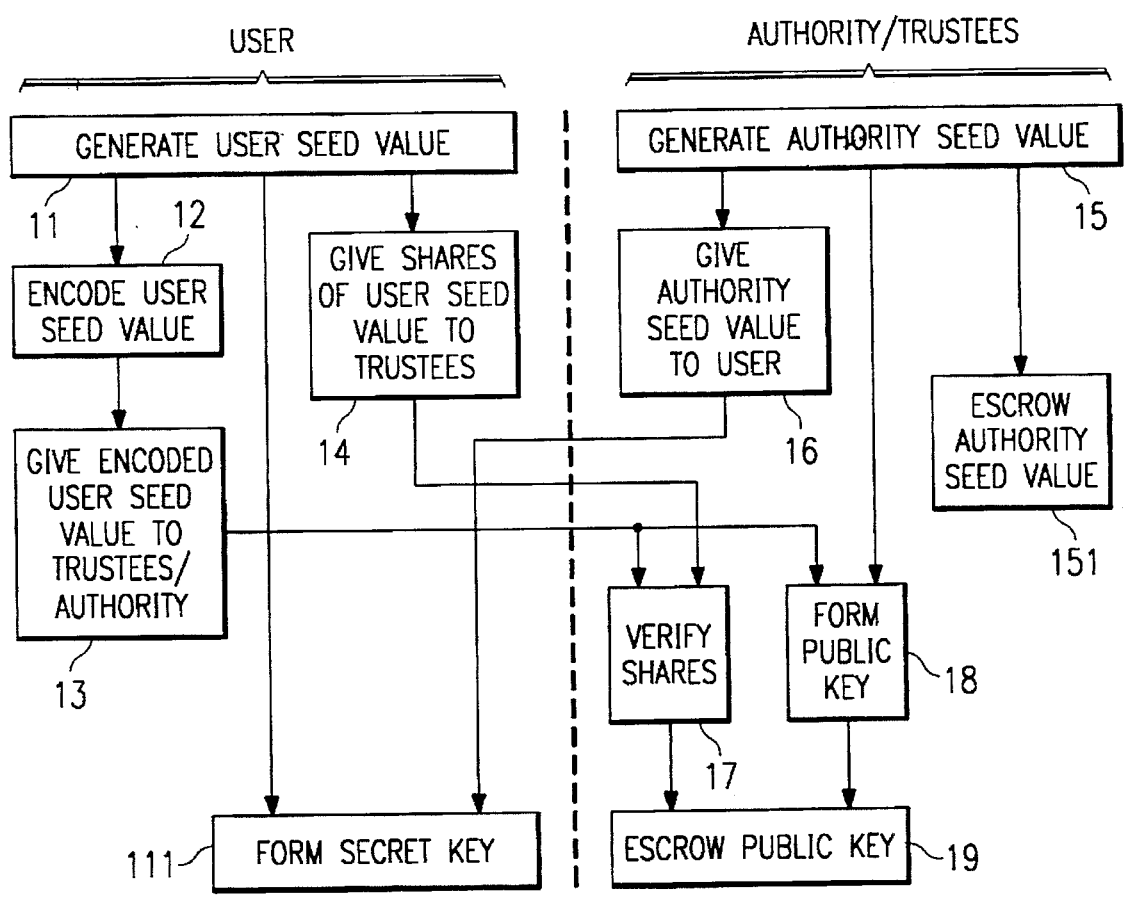
FIG. 1 is a flow-chart for creating a cryptographic key for a user in accordance with the present invention.

The present invention comprises a system for allowing public escrowing of cryptographic keys. The following analysis describes one embodiment of the Failsafe Key Escrow approach. This embodiment is based on a Discrete-Log PKC such as Diffie-Hellman or DSS. The present analysis assumes that a prime modulus Q and a generator G for $Z_Q$ are publicly known. In this case the public key $P_X$ that is escrowed for user X is $G^{S_X}$ mod Q, where $S_X$ is the secret key for user X. The escrow system that will be used in conjunction with the U.S. Digital Signature Standard has this form.

The keys for a user X are selected as follows:

Step 1: The user picks a random secret value A from [0, Q–2] and announces the value of $G^A$ mod Q to the trustees and/or the central authority.

Step 2: The user "shares" A with the trustees using a VSS scheme. (The precise VSS scheme that is used depends on the degree to which the trustees can be trusted to behave properly and the degree to which the users distrust the trustees.) This requires X to send the shares of A to the trustees and it requires the trustees to verify that they received valid shares of A.

Step 3: The trustees and/or the central authority select a random value B from the interval [0, Q–2] and they set the user's public key to be $P_X=(G^A)G^B$ mod Q. The value of B is returned to the user and is escrowed with the public key for X. The value of B is not released to the public.

Step 4: The user then sets his secret key to be $S_X$=A+B mod (Q–1).

In what follows, it is shown that in preferred embodiments of the invention, Properties 1–5 hold for this system. For simplicity, we will argue informally.

Verification of Property 1: Every user who follows the protocol can be sure that he or she has a randomly chosen secret key. This is because the user chooses A at random in [0, Q–2]. The authority chooses B, but does so with no knowledge of A (depending on the VSS scheme that is used). Hence, from the user's point of view, A might as well have been selected after B. This means that if A was selected at random by the user, then the user can be assured that $S_X$=A+B mod (Q–1) is a random integer in [0, Q–2].

Verification of Property 2: Even a user who fails to select the value of A correctly (e.g., by using a birthday instead of a random number generator) will get a random secret key. This is because the value of B is selected randomly by the authorities after the user commits to the value of A. Hence, the authorities can be assured that $S_X$=A+B mod (Q–1) is a random integer in [0, Q–2].

Verification of Property 3: Each user can be assured that his or her secret key stays secret unless a sufficient number of trustees release their shares. This is because knowledge of A can be revealed only with the assent of a sufficient number of trustees by the properties of the VSS scheme. Even if B were to be public, this means that A+B mod (Q–1) will remain secret unless a sufficient number of trustees cooperate to reveal A.

Verification of Property 4: The central authority is guaranteed to be able to retrieve the secret key of any user provided that a sufficient number of trustees reveal their shares. This is because the properties of the VSS scheme assure that a sufficient number of trustees can collaborate to reveal A. Since B is escrowed, it is then a simple matter to compute $S_X$=A+B mod (Q–1).

Verification of Property 5: If two criminals attempt to abuse the FKE by using their public keys to communicate using any published public-key encryption algorithm, and the central authority is provided knowledge of the criminals' secret keys by the trustees, then it should be as easy (at least on a probabilistic basis) for the central authority to decrypt the message traffic between the criminals as it is for the criminals themselves to decrypt that traffic.

Proving this fact is somewhat more difficult. Suppose that two criminals X and Y attempt to abuse the FKE by using their public keys to communicate using any published PKC. Let $P'_X$ be the public key for X in the PKC. Without loss of generality, we will assume that $P'_X$ is computable as a published function F of $P_X$. (I.e., $P'_X=F(P_X)$.) Otherwise, the criminals would be using secret information to communicate (in which case, they wouldn't need to abuse the FKE in the first place).

Let $S'_X$ be the matching secret key for $P'_X$ in the PKC, and define H to be the (published but presumably hard to compute) function that maps a public key of the PKC to its corresponding secret key. (I.e., $S'_X=H(P'_X)$.) Then $S'_X=HF(P_X)=HFE(S_X)$, where $E(S_X)=G^{S_X}$ mod Q. Since $S_X$=A+B mod (Q–1), we know that $S'_X$=R(A+B mod (Q–1)), where R=HFE is a published (but possibly hard to compute) function.

The user picks A and so he or she may know a great deal of information about A that is unknown to the central authority (such as the discrete-log of A). This means that it might be much easier for the user to compute R(A) than it would be for the central authority to compute R(A). The user has no control over the distribution of A+B mod (Q–1), however, since this distribution is uniform for all A. This means that before B is selected, the user can generate no more information (probabilistically speaking) about A+B mod (Q–1) than can the central authority in an equivalent amount of time. (To be precise, it is necessary to assume that the central authority has the same initial knowledge and computational power as the user for this statement to be true.) Once B is selected, both the user and the central authority know A+B mod (Q−1) (assuming that the trustees have cooperated to reveal A, of course), and the central authority will be equally capable of generating $S'_X$ as the user.

This completes the sketch of the proof that Property 5 holds for the FKE protocol.

Similar protocols can be developed for use with other PKCs such as RSA, but the details become more complicated since the authorities need to interact with the user to choose a "random" number with some special structure. For example, the public keys used with RSA need to be the product of a small number of primes.

The proof method just described can also be extended to show that the FKE system provides security against collections of criminals that band together to produce public keys which can be combined to form a single public key in another cryptosystem.

Failsafe Key Escrow systems can be used in conjunction with any PKC to protect the interests of both law enforcement and the users. FKE may prove to be particularly valuable in the context of the new U.S. Digital Signature Standard (DSS). In particular, it will be important to insure that criminals are not able to use DSS keys for the purposes of encrypting communications in a way that is indecipherable to the Government. This issue is of particular concern in the context of DSS since DSS keys can be easily adapted for encryption. The FKE approach described in Section 3 prevents precisely this sort of abuse.

It is also worth pointing out the limitations of the Failsafe Key Escrow Approach. Most importantly, the FKE approach does not prevent a pair of criminals from communicating securely using secret information or an alternative escrow system, or from using other protocols for secret key agreement. The main point of the FKE is to prevent criminals from abusing the public keys in the key escrow system. In other words, by designing the key escrow system in a failsafe fashion, the Government can be assured that the escrow system will not make it any easier for criminals to communicate securely.

REFERENCES

[1] G. Blakley. Safeguarding cryptographic keys. In *AFIPS—Conference Proceedings*, 48:313—317, June 1979.

[2] B. Chor, S. Goldwasser, S. Micali, and B. Awerbuch. Verifiable secret sharing and achieving simultaneity in the presence of faults. *Proceedings of the 26th IEEE Symposium of Foundations of Computer Science*, pages 383–395, 1985.

[3] J. Killian. Fair public-key cryptosystems aren't. Unpublished manuscript, 1994.

[4] T. Leighton and S. Micali. Secret key distribution without public-key cryptography. *Crypto 93*, August 1993.

[5] S. Micali. Fair public-key cryptosystems. Technical Report 579, MIT Lab. for Computer Science, September 1993.

[6] A. Shamir. How to share a secret. *Communications of the ACM*, 22(11):612–613, 1979.

[7] G. Simmons. How to really share a secret. *Crypto 90*, pages 390–448, August 1990.

The foregoing references are hereby incorporated herein by reference.

FURTHER DISCUSSION

The example discussed above in connection with the Discrete-Log PKC is in fact a specific usage of the following approach, described here in connection with FIG. 1. FIG. 1 illustrates a preferred embodiment of a method for establishing a cryptographic key for a user in accordance with the present invention. The user generates a user seed value (step 11), as well as an encoded version of the user seed value (step 12). (The user seed and encoded version of the user seed were A and $G^A$ mod Q respectively in the example.) Next (step 14) the user gives shares of the user seed to the trustees using a VSS scheme. In addition, the user provides (step 13) the encoded version of the user seed number to the trustees and/or an authority. (The trustees verify their shares, based on the encoded user seed value, using the VSS scheme in step 14.) (The term "authority" in the claims may refer not only to a central authority but also to a trustee or several trustees acting jointly.) The trustees and/or the authority select (step 15) an authority seed number (called B in the example above), and derive the user's public key (step 18) as a specified function of the encoded user seed and the authority seed. The authority seed is provided (step 16) to the user and also escrowed (step 15) in association with the user's public key. [The authority seed is preserved by the escrow in confidence, and can be accessed by the central authority only upon proper authorization. Proper authorization is also required for the trustees to give the authority access to the shares of the user seed. Access to these shares, under VSS schemes, permits recovery of the user seed. With access to these two seeds (the user seed and the authority seed) the secret key can be generated by the authority using the same function as used by the user.] The user generates (step 111) his secret key as a specified non-degenerate function of the user seed, e.g., "A+B mod (Q−1)" as defined in step 4 above. The function "A+B mod (Q−1)" is non-degenerate because if either A or B (the respective user value or authority seed value) is altered, then the function value is altered and the authority seed. The term "escrow" of information as used in this description and in the following claims includes any arrangement for facilitating access to cryptographic keys, including distribution in shares, and may include means for preventing access to information except upon specified conditions.

Moreover, cryptographic keys can be generated in other fashions using the user seed and the authority seed. The order in which the user seed is given to the trustees (in shares) and in which the authority seed is given to the user is not critical, if care is taken to observe the five properties described in Section 1 above. I call these five properties collectively the "FKE properties".

What is claimed is:

1. A method of generating cryptographic keys for use in securing communications among users in a cryptosystem having an authority and a plurality of trustees, where trustees must cooperate in a predetermined manner to reveal a secret key, comprising the steps of:

for each user, verifiably secret sharing a first seed value with the plurality of trustees, the first seed value alone being insufficient to reveal a secret key even if the trustees cooperate; and for each user, generating a secret key by computing a given function of the first seed value associated with that user and a second seed value generated by the authority, wherein neither the user nor the authority can derive the given function from just their respective seed values.

2. The method as described in claim 1 further including the step of:

for each user, computing a public key from information derived from the first seed value associated with the user.

3. The method as described in claim 2 further including the step of:

escrowing the public key for each user.

4. The method as described in claim 1 wherein the first seed value is selected at random by each user.

5. The method as described in claim 4 wherein the first seed value is selected at random by each user prior to generation of the second seed value by the authority.

6. In a cryptosystem having a plurality of users, one or more trustees and a central authority, where the one or more trustees and the authority cooperate under predetermined circumstances to reveal a secret key, an improved method for generating and using cryptographic keys, comprising the unordered steps of:

for each user, generating a first seed value, shares of which are provided to the trustees so that the first seed value can be reconstructed if the trustees reveal their shares;

having the authority generate a second seed value; and for each user, generating a secret key by computing a given function of the first seed value and the second seed value generated by the authority, wherein the given function cannot be derived from just the first seed value or from just the second seed value;

for each user, generating a public key for the secret key;

encrypting at least one message using a key derived according to a publicly-known process from the public key; and having the authority and the trustees cooperate under a predetermined circumstance to reconstruct the secret key to thereby decrypt the message.

7. A method of securing communications among users in a cryptosystem having a plurality of trustees, comprising the unordered steps of:

for each user, verifiably secret sharing a first seed value with the plurality of trustees;

for each user, generating a secret key by computing a given function of the first seed value associated with that user and a second seed value, wherein the user cannot derive the given function from just the first seed value;

for each user, escrowing a public key associated with that user;

upon a predetermined occurrence, having a sufficient number of trustees cooperate to reveal the first seed value associated with a suspect user to enable reconstruction of that user's secret key; and having the authority use the reconstructed secret key and the public key of the suspect user to monitor communications.

8. The method as described in claim 7 wherein the first seed value is alone insufficient to enable the plurality of trustees to construct a secret key useful in monitoring communications.

9. The method as described in claim 7 wherein the public key for each user is computed from information derived from that user's first seed value.

10. The method as described in claim 9 wherein the information is an encoded version of the user's first seed value.

* * * * *